(No Model.) 2 Sheets—Sheet 1.
F. W. ROBINSON.
STRAW STACKER.
No. 534,580. Patented Feb. 19, 1895.
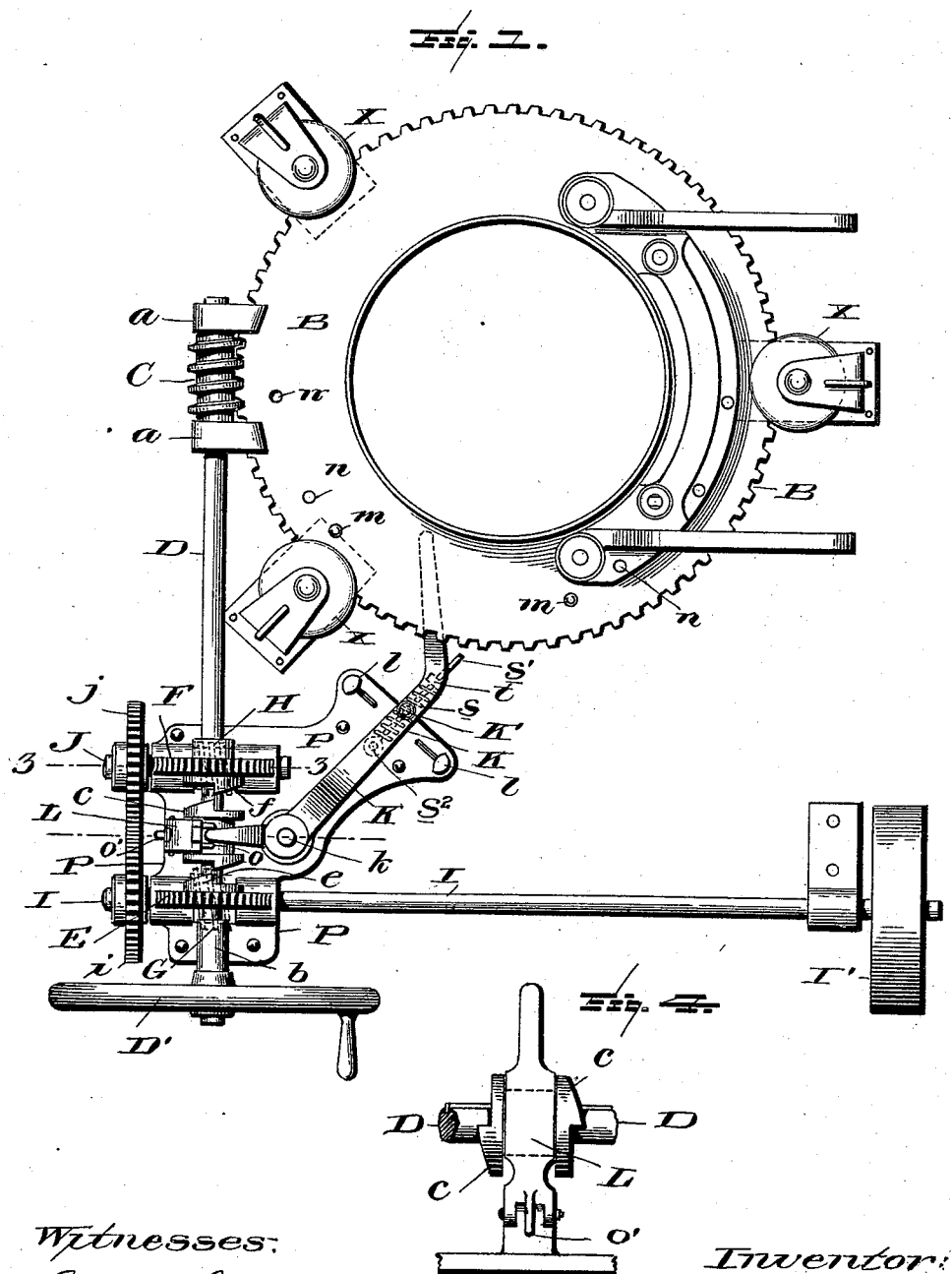
Witnesses:
L. C. Hills
J. B. Keefer
Inventor:
Francis W. Robinson
by Marcellus Bailey
his Atty.

(No Model.) 2 Sheets—Sheet 2.
F. W. ROBINSON.
STRAW STACKER.
No. 534,580. Patented Feb. 19, 1895.
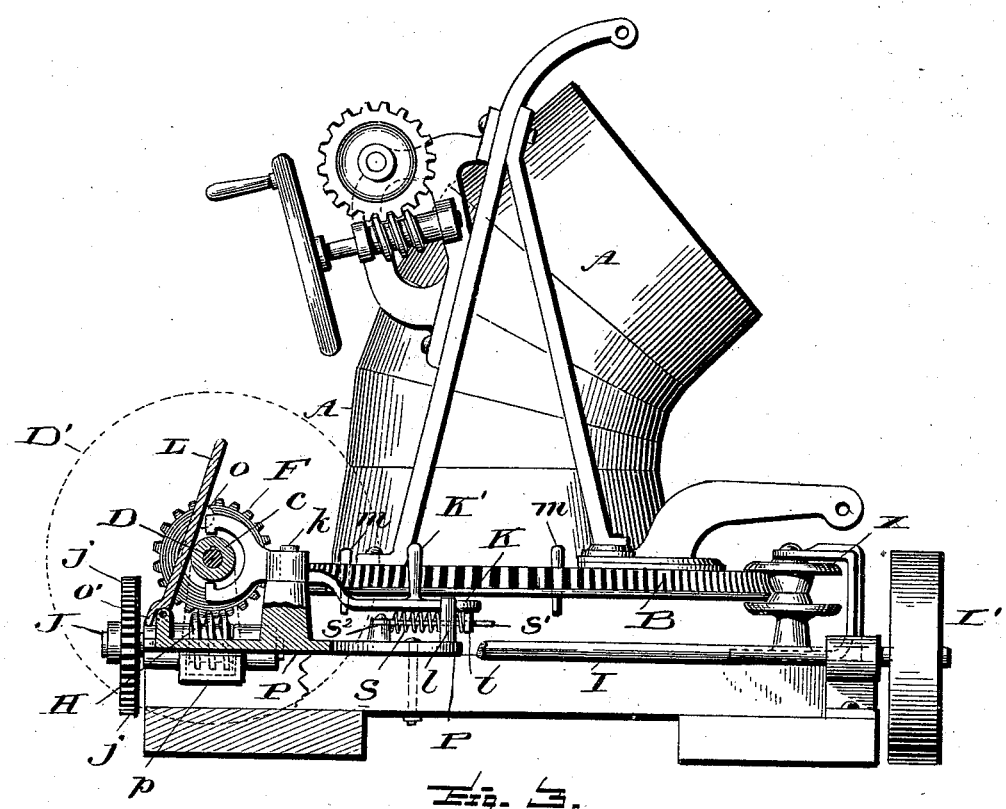
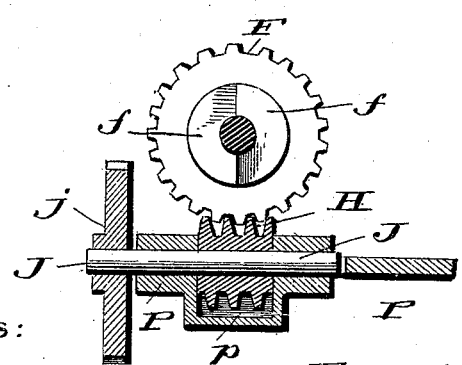
Witnesses:
L. C. Hills
J. B. Keefer
Inventor:
Francis W. Robinson,
by Macallus Bailey
his Atty.
THE NORRIS PETERS CO., PHOTO-LITHO., WASHINGTON, D. C.

UNITED STATES PATENT OFFICE.

FRANCIS W. ROBINSON, OF RICHMOND, INDIANA, ASSIGNOR TO THE ROBINSON & COMPANY, OF SAME PLACE.

STRAW-STACKER.

SPECIFICATION forming part of Letters Patent No. 534,580, dated February 19, 1895.

Application filed December 5, 1894. Serial No. 530,896. (No model.)

*To all whom it may concern:*

Be it known that I, FRANCIS W. ROBINSON, of Richmond, Wayne county, Indiana, have invented certain new and useful Improvements in Straw-Stackers, of which the following is a specification.

My invention relates to straw stackers for use in connection with thrashing machines, and it has particular reference to the means for automatically swinging the conveying trunk or chute from side to side for the purpose of evenly and properly distributing the straw discharged therefrom. Automatic mechanism of this character is old.

My invention resides in the particular construction and arrangement of the devices which I employ for the purpose and can best be explained and understood by reference to the accompanying drawings in which I have represented the invention as applied to the trunk or chute of a pneumatic, or wind, stacker. I desire it to be understood however, that the same is applicable also to the swinging chutes or conductors of straw stackers generally.

In the drawings Figure 1 is a plan of mechanism embodying my invention. Fig. 2 is a sectional side elevation of the same. Fig. 3 is a section on line 3—3 Fig. 1. Fig. 4 is a rear elevation of the device for locking the clutch in intermediate position.

A is the lower part—or "stump" as it is termed—of the conveyer trunk or chute, secured in any proper way to the worm wheel B, which encircles the neck of the fan case of the "wind" stacker in the usual way, and is supported by any suitable antifriction devices which will permit it to revolve. Those shown in the drawings consist of the flanged guide wheels X supported to revolve on vertical axes, and receiving between their flanges the rim of the worm wheel. These devices however form no part of this invention, but have been made by me the subject of a separate application of even date herewith.

My present invention has to do not with any special mounting of the trunk, but to the means for automatically swinging any oscillatory straw stacking trunk or chute.

The worm wheel is engaged as usual by a worm C upon a shaft D, supported in end bearings $a$ and $b$, and having loosely mounted upon it the two worm wheels E F. Between the two wheels is mounted upon shaft D, the movable member $c$ of a clutch, having a longitudinal groove and spline connection with the shaft so that it can be moved toward one or the other of the worm wheels, with a view to throwing one or the other of its clutch faces into mesh or engagement with one or the other of the corresponding clutch faces $e$ $f$ with which the worm wheels E F are respectively provided. Beneath the wheel E is a worm G engaging it, this worm being fast upon a shaft I, supported to revolve in proper bearings, and provided at its outer end with a pulley I' driven by belting from some suitable source of power—usually the shaft of the fan of the "wind" stacker. The wheel F in like manner is engaged by a worm H placed beneath it upon a short axle or shaft J, parallel with shaft I, and supported in proper bearings. The two shafts I, J, are geared together by spur gears $i$ $j$ fast upon them.

The clutch is thrown by means of a clutch lever K, pivoted at $k$ and provided with a forked end which straddles the hub of the clutch and enters a circumferential groove in the same in the usual way. The opposite end of the clutch plays between two stops $l$ which limits its throw, and its extreme outer end projects under the worm wheel B in position to project into the path of pins $m$ inserted in selected ones of the holes $n$ in the worm wheel.

The clutch lever in Fig. 1 is shown in intermediate or central position. For the purpose of quickly throwing the lever after it passes to one side or the other of this position, I provide the spiral spring $s$ which is mounted upon a rod or stem $s'$ swiveled at $s^2$ to turn upon a vertical axis. The outer end of this rod passes loosely through a guide eye $t$ on the under side of the clutch lever, and the spring is held under compression between this eye $t$ and the base or pivotal point of the rod $s'$. The moment the clutch lever is moved past the dead center, the spring by its expansion quickly throws the lever completely over.

The bearings and stops for the clutch lever, the shaft J the inner end of shaft I and that of the worm shaft D on which the worm wheel is mounted, are all formed on or in a single casting P the base of which is secured to the stand or platform on which the stacker trunk or chute is mounted—this casting being also formed in its base with pockets $p$ to accommodate the worms G, H as well as to hold lubricating material for said worms.

The operation of the parts thus far described will be readily understood. The main or power shaft I being in revolution, the worm wheels E and F will be revolved in opposite directions, without however affecting shaft D so long as the clutch is in the intermediate position shown in Fig. 1. If, however, the clutch lever be thrown by hand (for which purpose it has a handle K') to engage either one of the worm wheels E F—say for example the wheel E, then the shaft D will revolve with that wheel, with the effect of imparting rotary movement to the large worm wheel B and consequently of swinging the stacker trunk or chute in one direction. This movement continues until one of the pins $m$ on the worm wheel B meets and strikes the clutch lever. The effect of this is to throw the clutch lever over so that its clutch will leave wheel E and engage wheel F, thus reversing the direction of movement and causing the trunk to swing in the opposite direction; and so the operation is kept up indefinitely.

Under the arrangement shown, the worm shaft D can if need be, be revolved by hand in the same direction as that in which it is moved by the wheel E or F with which it may happen to be engaged but at a greater speed than that at which the wheel moves, even while it is still in clutch with that wheel. For this purpose it is provided with a hand wheel D' by which its rotary movement can be accelerated whenever desired. So too, it not infrequently occurs that the automatic mechanism cannot profitably be used and in that case the hand wheel D' comes into play also. In order at this time to hold the movable clutch member securely in its idle intermediate position out of engagement with either one of the driving wheels E F, I employ a locking lever L, pivoted at its lower end upon a horizontal axis in a bearing formed for it on the casting P. This lever when swung forward drops into the space between the two clutch faces of the movable clutch member, fitting snugly between them so as to prevent any sliding movement of the clutch. It also is provided with two prongs $o$ which straddle the inner end of the clutch lever, and hold that lever firmly in place against any possible shift of position which might bring the stress of its spring $s$ against the clutch. The locking lever is provided with a stop projection or finger $o'$ which prevents it from being thrown back too far when it is moved out of engagement with the clutch.

This automatic mechanism is very efficient in operation, simple, inexpensive, very compact, and not liable to get out of order. It can be readily and easily applied, and its parts are so arranged that any of them can be removed and replaced expeditiously and without difficulty.

Having described my invention, what I claim, and desire to secure by Letters Patent, is—

1. The combination with the trunk driving worm wheel B and the worm shaft D for operating the same, of the power shaft I and parallel counter shaft J placed crosswise of and below shaft D, said shafts being geared together, and having on them worms G, H, the worm wheels E F mounted loosely upon shaft D and engaging the worms G H beneath them, the movable clutch member mounted upon the shaft D between wheels E F and adapted to engage one or the other of corresponding clutch members upon the interior opposite faces of the wheels E F, and the clutch lever adapted to be actuated by pins or stops upon the main worm wheel B or some part moving in unison therewith, under the arrangement and for joint operation as hereinbefore shown and set forth.

2. In an automatic mechanism for swinging the discharging trunk or chute of a straw stacker, the combination with the power shaft I, and the trunk-driving worm-wheel B, of the worm shaft D, provided with worm gear C for engaging wheel B, and with a handle D', in combination with the two worm wheels E F loosely mounted on said shaft and devices operated from the power shaft I for driving said wheels continuously in opposite directions, the movable clutch member mounted upon shaft D between said wheels and adapted to engage one or the other of corresponding clutch members upon the interior opposite faces of said wheels E F, means for automatically shifting the movable clutch member, and means for rigidly locking it in an intermediate position of rest, as and for the purposes hereinbefore set forth.

3. The combination with the operating shaft D, the driving wheels E F loose thereon, the movable clutch member mounted upon said shaft and adapted to engage one or the other of said wheels or to occupy an intermediate position out of engagement with both of them, the clutch operating lever, and a locking lever to directly and positively engage both the clutch lever and the movable clutch member, and to exercise independent locking action upon each of them, substantially as and for the purposes hereinbefore set forth.

In testimony whereof I have hereunto set my hand this 1st day of December, 1894.

FRANCIS W. ROBINSON.

Witnesses:
F. B. KEEFER,
R. E. MANNING.